US012763420B2

(12) United States Patent
Zhang et al.

(10) Patent No.: US 12,763,420 B2
(45) Date of Patent: Oct. 13, 2026

(54) TRACTION BATTERY PACK ENCLOSURE SEAL ASSEMBLY AND SEALING METHOD

(71) Applicant: Ford Global Technologies, LLC, Dearborn, MI (US)

(72) Inventors: Xiaogang Zhang, Novi, MI (US); Nathaniel Conti, Canton, MI (US); Samuel Jeffrey Tomlinson, Farmington Hills, MI (US); Parikshit S. Gupte, West Bloomfield, MI (US)

(73) Assignee: Ford Global Technologies, Dearborn, MI (US)

( * ) Notice: Subject to any disclaimer, the term of this patent is extended or adjusted under 35 U.S.C. 154(b) by 932 days.

(21) Appl. No.: 17/889,792

(22) Filed: Aug. 17, 2022

(65) Prior Publication Data

US 2024/0063495 A1 Feb. 22, 2024

(51) Int. Cl.

*H01M 50/271* (2021.01)
*B60L 50/64* (2019.01)
*H01M 50/204* (2021.01)
*H01M 50/258* (2021.01)
*H01M 50/262* (2021.01)

(52) U.S. Cl.

CPC ........... *H01M 50/271* (2021.01); *B60L 50/64* (2019.02); *H01M 50/204* (2021.01); *H01M 50/258* (2021.01); *H01M 50/262* (2021.01); *H01M 2220/20* (2013.01)

(58) Field of Classification Search

None

See application file for complete search history.

(56) References Cited

U.S. PATENT DOCUMENTS

| | | | | |
|---|---|---|---|---|
| 11,211,655 | B2 | 12/2021 | Miller et al. | |
| 11,342,617 | B2 | 5/2022 | McManaman et al. | |
| 11,387,518 | B2 | 7/2022 | Kaiser et al. | |
| 2012/0164500 | A1 | 6/2012 | Loo et al. | |
| 2016/0293914 | A1* | 10/2016 | Miller ................. | H01M 50/271 |
| 2017/0018747 | A1* | 1/2017 | Yamada ............... | H01M 50/211 |
| 2019/0081297 | A1* | 3/2019 | Nakamori ........... | H01M 50/249 |
| 2020/0052252 | A1 | 2/2020 | Smith et al. | |
| 2023/0282916 | A1* | 9/2023 | Bhandari ............ | H01M 50/271 429/163 |

FOREIGN PATENT DOCUMENTS

| | | | |
|---|---|---|---|
| CN | 106816560 | B | 6/2019 |
| JP | 2011194982 | A | 10/2011 |

* cited by examiner

*Primary Examiner* — Gregg Cantelmo
(74) *Attorney, Agent, or Firm* — David B. Kelley; Carlson, Gaskey & Olds, P.C.

(57) ABSTRACT

An assembly includes a first piece of an enclosure having an interior area. The first piece has a first flange that projects outward from the interior area. The assembly also includes a second piece of the enclosure, the second piece including a second flange that projects outward from the interior area. The assembly further includes a gasket seal that is sandwiched between the first and second flanges. The first and second flanges are secured together at a flange-to-flange interface that is between the gasket seal and the interior area.

18 Claims, 6 Drawing Sheets

TRACTION BATTERY PACK ENCLOSURE SEAL ASSEMBLY AND SEALING METHOD

TECHNICAL FIELD

This disclosure relates generally to sealing interfaces of a traction battery enclosure.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack assembly can power the electric machines. The traction battery pack assembly of an electrified vehicle can include groups of battery cells.

SUMMARY

In some aspects, the techniques described herein relate to an assembly, including: a first piece of an enclosure having an interior area, the first piece including a first flange that projects outward from the interior area, a second piece of the enclosure, the second piece including a second flange that projects outward from the interior area; and a gasket seal sandwiched between the first and second flanges, the first and second flanges secured together at a flange-to-flange interface that is between the gasket seal and the interior area.

In some aspects, the techniques described herein relate to an assembly, wherein the first and second flanges are welded together along the flange-to-flange interface.

In some aspects, the techniques described herein relate to an assembly, further including a plurality of fasteners that connect the first flange to the second flange along the flange-to-flange interface.

In some aspects, the techniques described herein relate to an assembly, wherein the first and second flanges project outward from the interior area past the gasket seal, wherein the first flange and the second flange are spaced a distance from each other in the areas outside the gasket seal relative to the interior area.

In some aspects, the techniques described herein relate to an assembly, further including a mechanical fastener that secures the first flange to the second flange at a position outside the gasket seal relative to the interior area.

In some aspects, the techniques described herein relate to an assembly, wherein the first and second flanges project outward in a horizontal direction, wherein the first flange is spaced a distance vertically from the second flange in the areas outside the gasket seal relative to the interior area.

In some aspects, the techniques described herein relate to an assembly, wherein, in areas outside the gasket seal relative to the interior area, no portion of the first flange contacts any portion of the second flange.

In some aspects, the techniques described herein relate to an assembly, wherein a distance between the first flange and the second flange where the gasket seal is sandwiched between the first flange and the second flange is the same as a distance between an outermost edge of the first flange and an outermost edge of the second flange.

In some aspects, the techniques described herein relate to an assembly, further including at least one array of battery cells disposed within the interior area.

In some aspects, the techniques described herein relate to an assembly, wherein the gasket seal extends circumferentially continuously about the interior area.

In some aspects, the techniques described herein relate to an assembly, wherein the first piece is an enclosure lid of a battery enclosure, and the second piece is an enclosure tray of the battery enclosure.

In some aspects, the techniques described herein relate to an assembly, wherein the flange-to-flange interface extends outward from the interior area for at least five millimeters.

In some aspects, the techniques described herein relate to an enclosure securing method, including: sealing an interface by compressing a gasket seal between a first flange of a first piece of an enclosure and a second flange of a second piece of the enclosure, the enclosure providing an interior area that houses a plurality of battery cells; and securing the first flange to the second flange along a flange-to-flange interface that is between gasket seal and the interior area.

In some aspects, the techniques described herein relate to an enclosure securing method, further including welding the first flange to the second flange at the flange-to-flange interface.

In some aspects, the techniques described herein relate to an enclosure securing method, wherein the gasket seal extends circumferentially continuously about a perimeter of the interior area.

In some aspects, the techniques described herein relate to an enclosure securing method, further including spacing the first flange a distance from the second flange at a position that is outside the gasket seal relative to the interior area.

In some aspects, the techniques described herein relate to an enclosure securing method, further including mechanically fastening the first flange to the second flange at a position that is outboard the gasket seal.

In some aspects, the techniques described herein relate to an enclosure securing method, wherein the first flange and the second flange are space from each other outside the gasket seal such that an area of the gasket seal is exposed.

In some aspects, the techniques described herein relate to an enclosure securing method, further including holding at least one array of battery cells within the interior area.

In some aspects, the techniques described herein relate to an enclosure securing method, wherein the enclosure is a battery pack enclosure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details assemblies and methods associated with sealing areas of an enclosure that houses a cell stacks within an interior area.

Each of the cell stacks within the enclosure can each include a plurality of individual battery cells. Enclosure pieces are joined to provide the enclosure. Interfaces between the enclosure pieces can be sealed to prevent contaminants and moisture from moving into the interior area.

Occasionally, a thermal propagation event could lead to increased pressure and temperature in one of the battery cells. The increasing pressure and temperature can rupture the battery cell, which results in a venting of gas from the interior of the battery cell. The disclosure, in particular, details assemblies and methods that can shield sealed areas from vented gas so that vented gas releases to the ambient environment through desired areas rather than through the sealed interfaces between the enclosure pieces.

Figure 1:
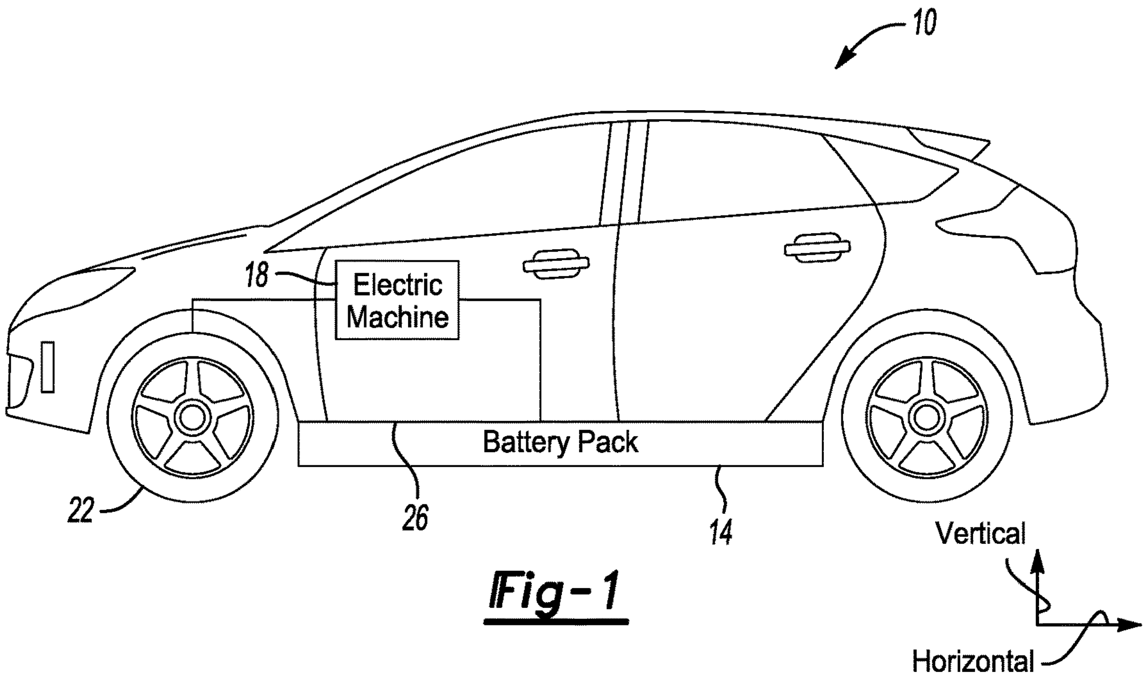
FIG. 1 illustrates a side view of an example electrified vehicle having a traction battery.

With reference to FIG. 1, an electrified vehicle 10 includes a traction battery pack 14, an electric machine 18, and wheels 22. The traction battery pack 14 powers an electric machine 18, which can convert electrical power to torque to drive the wheels 22.

The traction battery pack 14 is, in the exemplary embodiment, secured to an underbody 26 of the electrified vehicle 10. The traction battery pack 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

Figure 2:
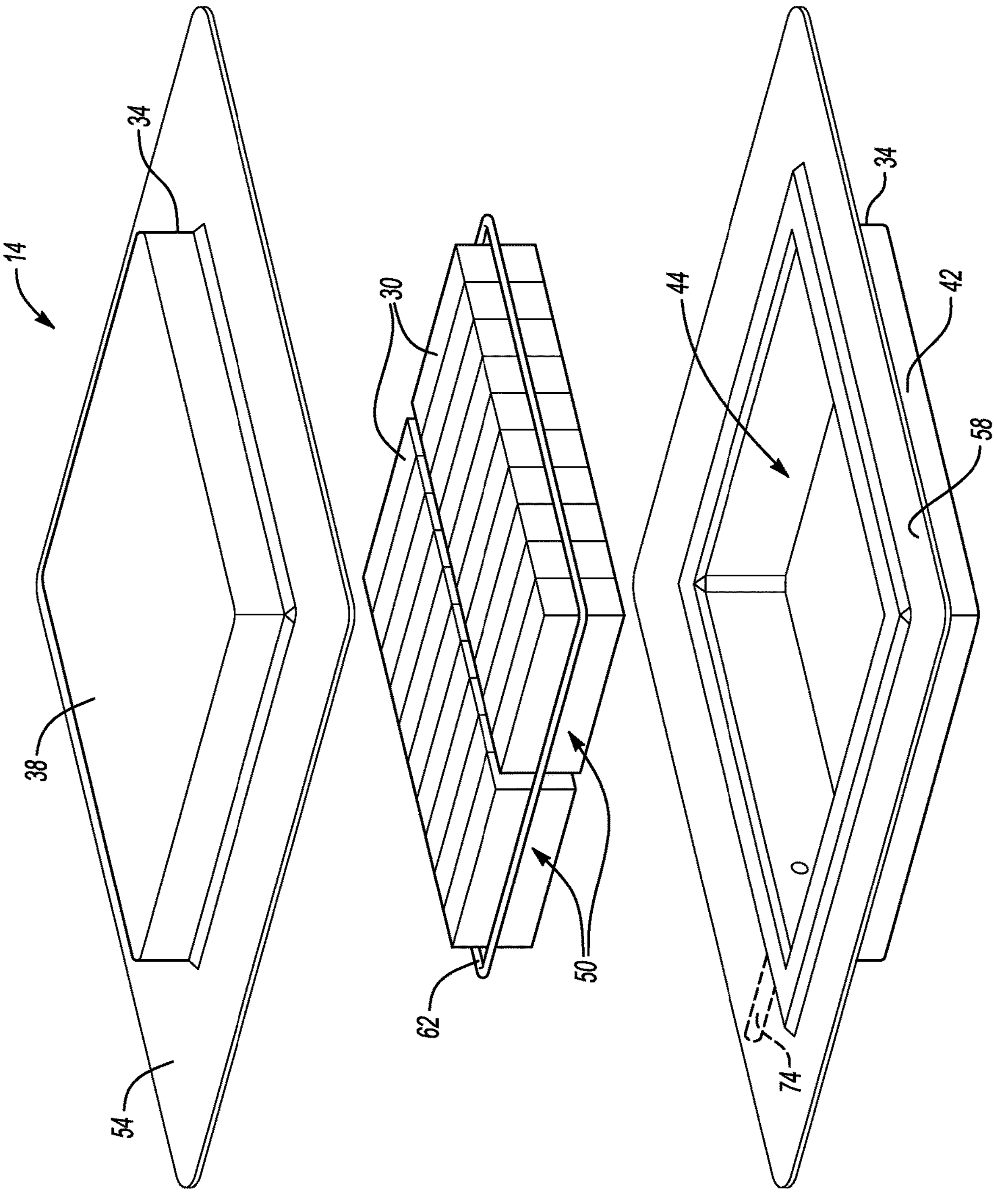
FIG. 2 illustrates an expanded view of selected portions of the traction battery pack from the vehicle of FIG. 1.

With reference now to FIG. 2, the traction battery pack 14 includes a plurality of battery cells 30 held within an enclosure assembly 34. In the exemplary embodiment, the enclosure assembly 34 comprises various enclosure pieces. In particular, the example enclosure assembly 34 includes an enclosure cover 38 and an enclosure tray 42.

The enclosure cover 38 and enclosure tray 42 are secured together to provide an interior area 44 that houses the plurality of battery cells 30. The battery cells 30 can be grouped into arrays 50. The example enclosure assembly 34 houses two arrays 50 along with other components, busbars, modules, wiring harnesses, etc. of the traction battery pack 14.

The enclosure cover 38 includes a first flange 54 that projects outward from the interior area 44. The enclosure tray 42 includes a second flange 58 that projects outward from the interior area 44. The first flange 54 and the second flange 58 project horizontally in this example, but could project on other directions. Horizontal and vertical, for purposes of this disclosure, are with reference to ground and a general orientation of the vehicle electrified during operation.

Figure 4:
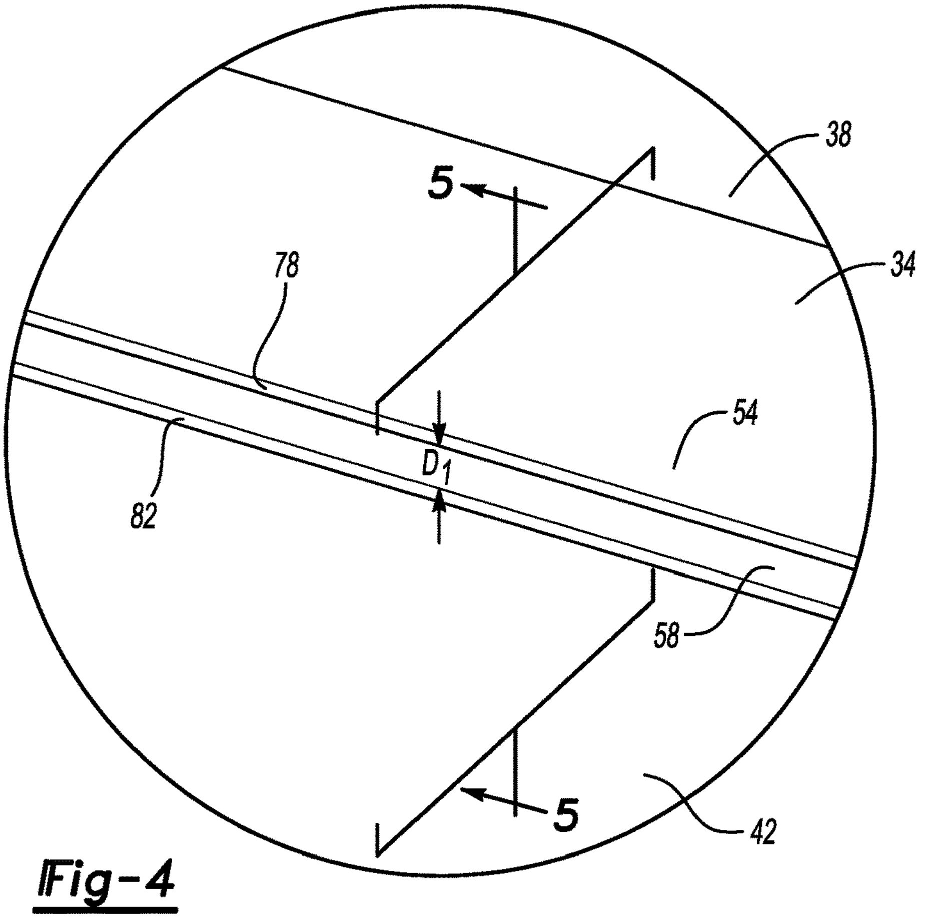
FIG. 4 illustrates a close-up view of Area 4 in FIG. 3.
Figure 3:
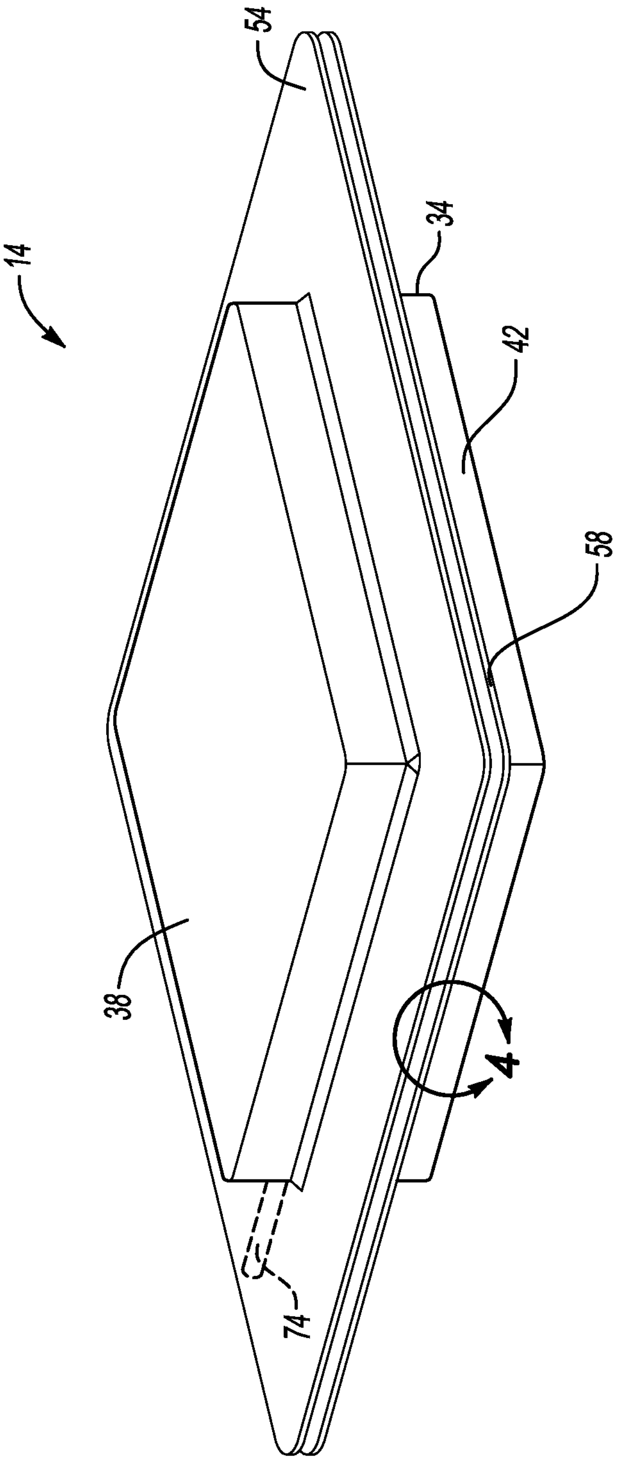
FIG. 3 illustrates the traction battery pack of FIG. 2 when assembled.
Figure 5:
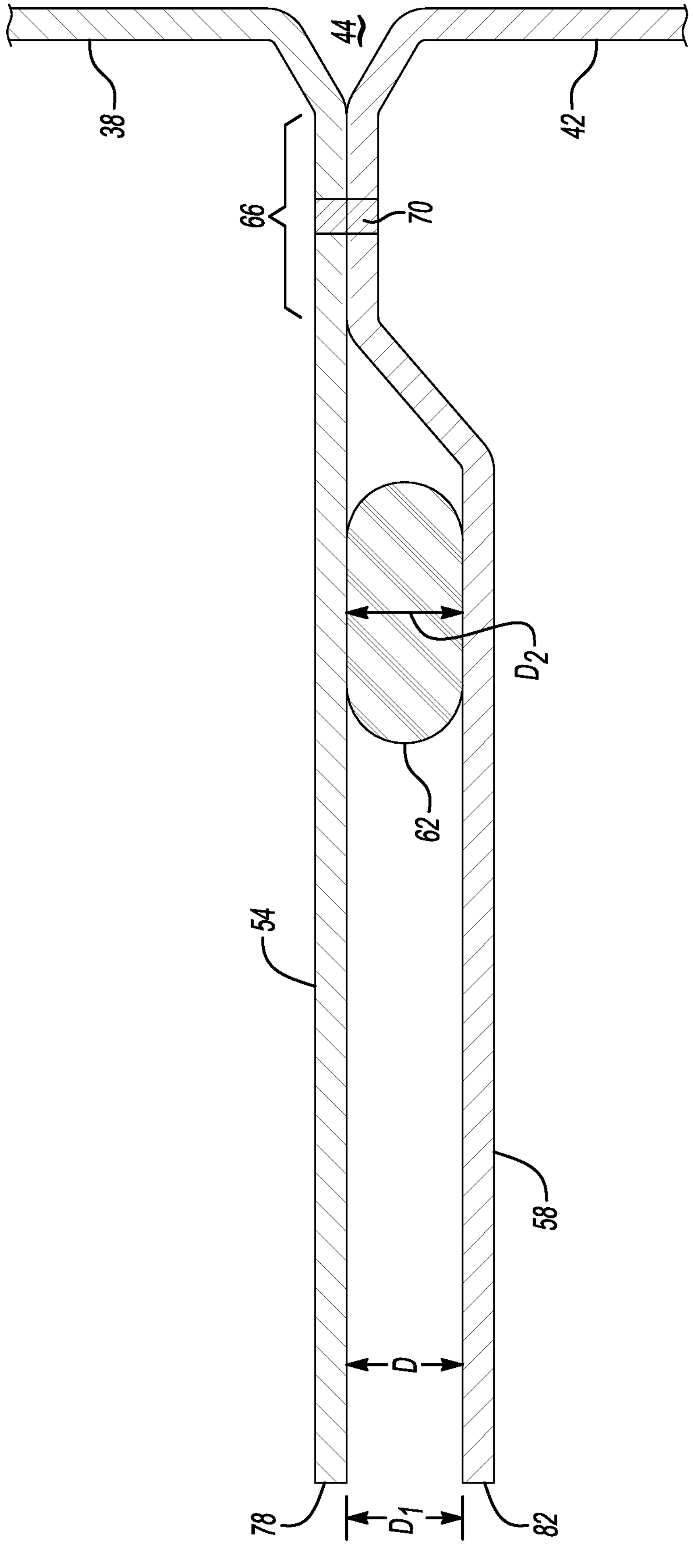
FIG. 5 illustrates a section view taken at line 5-5 in FIG. 4.

When the enclosure cover 38 and the enclosure tray 42 and in the assembled position of FIGS. 3-5, a gasket seal 62 or "sealing ring" is sandwiched between the first flange 54 and the second flange 58. In addition, the first flange 54 and second flange 58 are secured together at a flange-to-flange interface 66. In this example, spot welds 70 secure together the first flange 54 and the second flange 58 at the flange-to-flange interface 66. The first flange 54 and the second flange 58 directly contact each other at the flange-to-flange interface 66. The flange-to-flange interface 66 is at least five millimeters wide in this example.

The gasket seal 62 and the flange-to-flange interface 66 each extend circumferentially continuously about a perimeter of the interior area 44. The gasket seal 62 blocks moisture and contaminants from entering the interior area 44.

The flange-to-flange interface 66 is disposed between the gasket seal 62 and the interior area 44. If a thermal propagation event in the interior area 44 results in increased thermal energy and vented gas, the flange-to-flange interface 66 blocks vented gas and thermal energy from impinging directly on the gasket seal 62. This can help to maintain the integrity of the gasket seal 62 and can ensure that the vented gas and thermal energy is communicated from the interior area 44 in a desired area, such as through a vent port 74.

To further help reduce an amount of energy thermal energy near the gasket seal 62 during a thermal propagation event, the first flange 54 and the second flange 58 both project outward past the gasket seal 62 and, in this area just outboard the gasket seal 62, the first flange 54 and the second flange 58 are spaced vertically a distance D from each other. In this example, in areas outside the gasket seal 62 relative to the interior area 44, no portion of the first flange 54 contacts any portion of the second flange 58.

The distance D between the first flange 54 and the second flange 58 just outside the gasket seal 62 is, in this example, the same as a distance D1 between an outermost edge 78 of the first flange 54 and an outermost edge 82 of the second flange 58. Also, the distance D just outside the gasket seal 62 is the same as a distance D2 between the first flange 54 and the second flange 58 where the gasket seal 62 is sandwiched between the first flange 54 and the second flange 58.

The extension and spacing of the first flange 54 and the second flange 58 can increase surface area available for transferring thermal energy from the first flange 54 and the second flange 58 to the ambient air surrounding the enclosure assembly 34. Thermal energy can radiate to ambient from the first flange 54 and the second flange 58 rather than disrupting the integrity of the gasket seal.

In this example, the enclosure cover 38 and the enclosure tray 42 are a metal or metal alloy. In other examples, other materials could be used. One or both of the enclosure cover 38 and enclosure tray 42 could be a stamping, an extruded component, or a diecast component.

Figure 6:
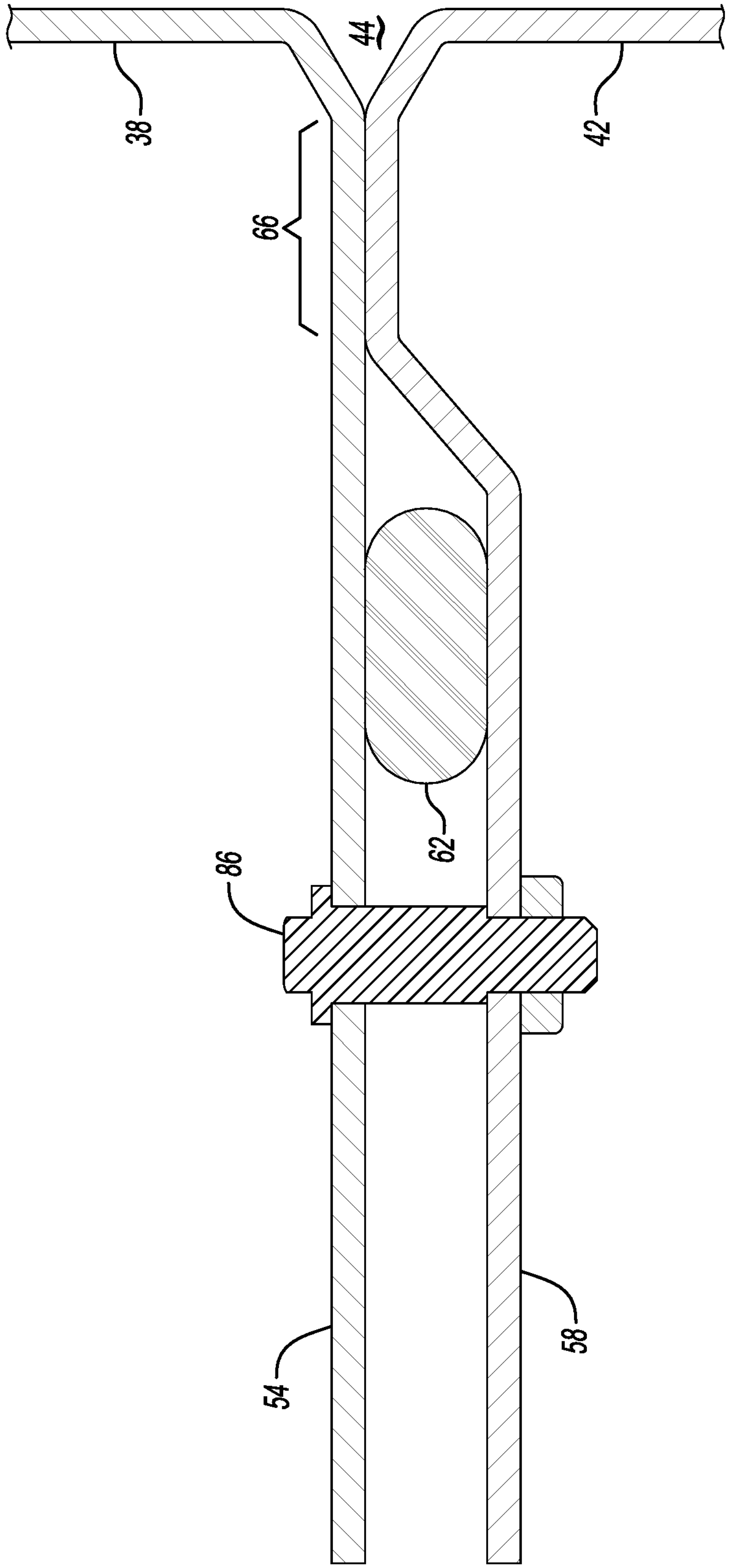
FIG. 6 illustrates a section view taken at the position of line 5-5 in FIG. 4 through an enclosure assembly according to another exemplary embodiment.

With reference to FIG. 6, another exemplary embodiment can include a mechanical fastener 86 joining the first flange 54 to the second flange 58 at a position outside the gasket seal 62. The fastener 86 is a shoulder bolt that is used to maintain a spacing between the first flange 54 and the second flange 58. In this example, the geometry of the first flange 54 and the second flange 58, along with the shoulder bolt, help to maintain the spacing between the first flange 54 and the second flange 58. In another examples, a bushing could be used to maintain the spacing between the first flange 54 and the second flange 58 instead of a shoulder bolt.

Figure 7:
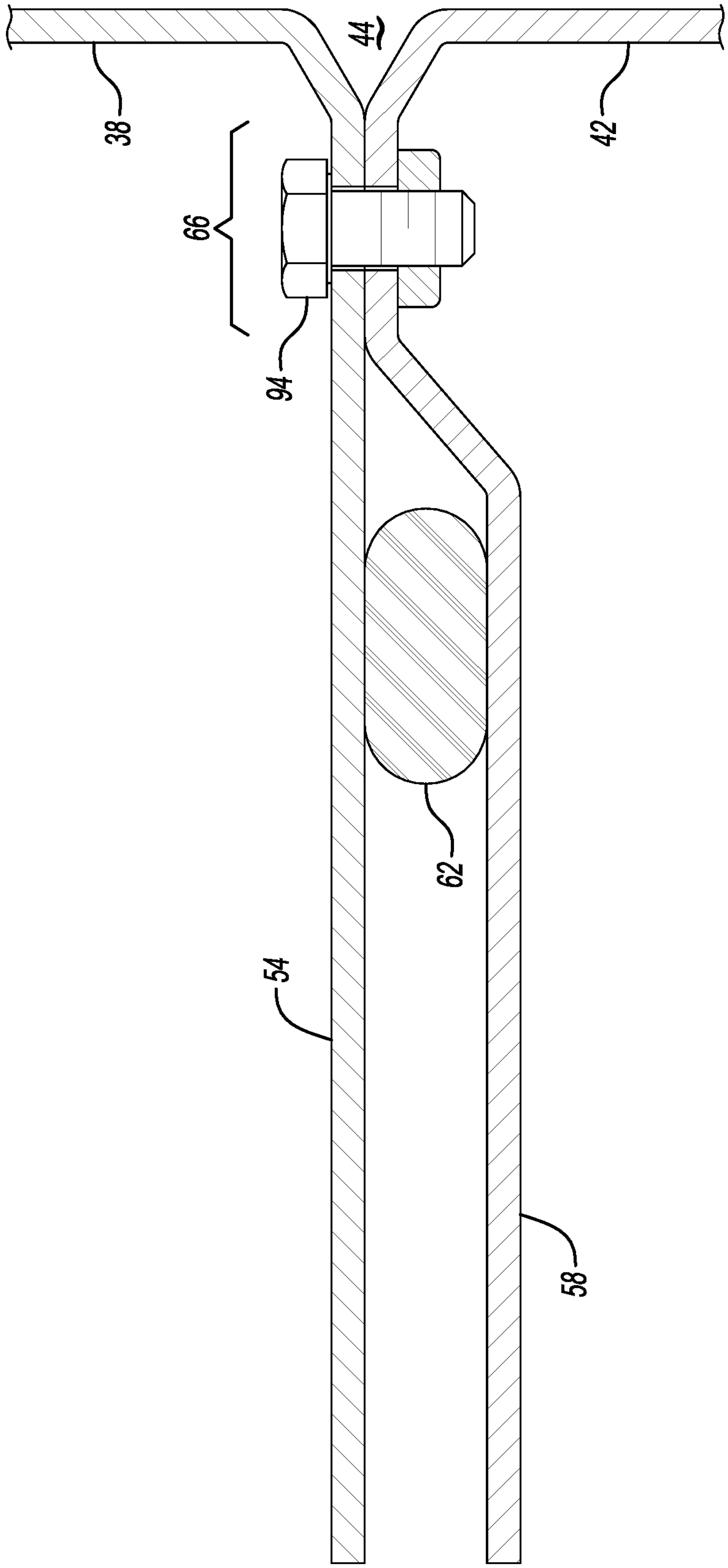
FIG. 7 illustrates a section view taken at the position of line 5-5 in FIG. 4 through an enclosure assembly according to another exemplary embodiment.

With reference to FIG. 7, another exemplary embodiment can include a plurality of mechanical fasteners 94 used to connect the first flange 54 to the second flange 58 at the flange-to-flange interface 66. The mechanical fasteners 94 are used rather than the spot welds 70. In another example, the mechanical fasteners 94 are used with the welds 70. The mechanical fasteners 86 of the FIG. 6 embodiment could also be used with the mechanical fasteners 94 of the FIG. 7 embodiment.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An assembly, comprising:

a first piece of an enclosure having an interior area, the first piece including a first flange that projects outward from the interior area, a second piece of the enclosure, the second piece including a second flange that projects outward from the interior area;

a gasket seal sandwiched between the first and second flanges, the first and second flanges secured together at a flange-to-flange interface that is between the gasket seal and the interior area; and a plurality of fasteners that connect the first flange to the second flange along the flange-to-flange interface.

2. The assembly of claim 1, wherein the first and second flanges project outward from the interior area past the gasket seal, wherein the first flange that is past the gasket seal and the second flange that is past the gasket seal are spaced a distance from each other, wherein the first and second flanges are secured directly to each other at the flange-to-flange interface.

3. The assembly of claim 2, further comprising a mechanical fastener that secures the first flange to the second flange at a position outside the gasket seal relative to the interior area.

4. The assembly of claim 2, wherein the first and second flanges project outward in a horizontal direction, wherein the first flange that is outside the gasket seal relative to the interior area is spaced a distance vertically from the second flange that is outside the gasket seal relative to the interior area.

5. The assembly of claim 1, wherein, in areas outside the gasket seal relative to the interior area, no portion of the first flange contacts any portion of the second flange.

6. The assembly of claim 1, wherein a distance between the first flange and the second flange where the gasket seal is sandwiched between the first flange and the second flange is the same as a distance between an outermost edge of the first flange and an outermost edge of the second flange.

7. The assembly of claim 1, further comprising at least one array of battery cells disposed within the interior area.

8. The assembly of claim 1, wherein the gasket seal extends circumferentially continuously about the interior area.

9. The assembly of claim 1, wherein the first piece is an enclosure lid of a battery enclosure, and the second piece is an enclosure tray of the battery enclosure.

10. The assembly of claim 1, wherein the flange-to-flange interface extends outward from the interior area for at least five millimeters.

11. An enclosure securing method, comprising:

sealing an interface by compressing a gasket seal between a first flange of a first piece of an enclosure and a second flange of a second piece of the enclosure, the enclosure providing an interior area that houses a plurality of battery cells; and securing the first flange to the second flange along a flange-to-flange interface that is between the gasket seal and the interior area, wherein a plurality of fasteners connect the first flange to the second flange along the flange-to-flange interface during the securing.

12. The enclosure securing method of claim 11, further comprising welding the first flange directly to the second flange at the flange-to-flange interface.

13. The enclosure securing method of claim 11, wherein the gasket seal extends circumferentially continuously about a perimeter of the interior area.

14. The enclosure securing method of claim 11, further comprising spacing the first flange a distance from the second flange at a position that is outside the gasket seal relative to the interior area.

15. The enclosure securing method of claim 14, further comprising mechanically fastening the first flange to the second flange at a position that is outboard the gasket seal.

16. The enclosure securing method of claim 11, wherein the first flange and the second flange are spaced from each other outside the gasket seal such that an area of the gasket seal is exposed.

17. The enclosure securing method of claim 11, further comprising holding at least one array of battery cells within the interior area.

18. An assembly, comprising:

a first piece of an enclosure having an interior area, the first piece including a first flange that projects outward from the interior area, a second piece of the enclosure, the second piece including a second flange that projects outward from the interior area; and a gasket seal sandwiched between the first and second flanges, the first and second flanges secured together at a flange-to-flange interface that is between the gasket seal and the interior area, wherein the first and second flanges directly contact each other at the flange-to-flange interface that is between the gasket seal and the interior area.

* * * * *